United States Patent
Gray et al.

(10) Patent No.: US 12,427,872 B2
(45) Date of Patent: Sep. 30, 2025

(54) TRACTION BATTERY PACK COATING CLEARING FEATURE AND COATING CLEARING METHOD

(71) Applicant: Ford Global Technologies, LLC, Dearborn, MI (US)

(72) Inventors: Ryan Scott Gray, Farmington Hills, MI (US); James Patrick Morency, Jr., Fraser, MI (US); Alexander Robert Rink, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 17/979,402

(22) Filed: Nov. 2, 2022

(65) Prior Publication Data
US 2024/0140209 A1    May 2, 2024

(51) Int. Cl.
*B60K 1/04* (2019.01)
*B60L 50/60* (2019.01)

(52) U.S. Cl.
CPC ............ *B60L 50/66* (2019.02); *B60K 1/04* (2013.01); *B60K 2001/0438* (2013.01)

(58) Field of Classification Search
CPC ........... B60K 1/04; B60L 50/66; B60L 50/64; H01M 50/264
See application file for complete search history.

(56) References Cited

U.S. PATENT DOCUMENTS

| | | | |
|---|---|---|---|
| 5,478,451 A | 12/1995 | Riffe | |
| 10,978,763 B2 | 4/2021 | Baek | |
| 11,038,236 B2* | 6/2021 | Montgomery | ...... H01M 50/244 |
| 2006/0012969 A1 | 1/2006 | Bachman | |
| 2010/0128456 A1 | 5/2010 | Hughes et al. | |
| 2012/0275878 A1* | 11/2012 | Yamada | ................. F16B 39/282 |
| | | | 411/335 |
| 2012/0285738 A1 | 11/2012 | Cochrane et al. | |
| 2015/0259806 A1 | 9/2015 | de Pierola | |
| 2016/0174420 A1 | 6/2016 | Cochrane | |
| 2018/0123102 A1 | 5/2018 | Lomax et al. | |
| 2020/0216966 A1 | 7/2020 | Hashemi | |
| 2021/0036282 A1 | 2/2021 | Junghans et al. | |
| 2023/0344169 A1* | 10/2023 | Thayer | ................. H01R 4/2483 |

FOREIGN PATENT DOCUMENTS

| | | |
|---|---|---|
| CN | 105802449 A | 7/2016 |
| CN | 210122552 U | 3/2020 |
| KR | 101004742 B1 | 1/2011 |

* cited by examiner

*Primary Examiner* — Jason D Shanske
*Assistant Examiner* — James J Triggs
(74) *Attorney, Agent, or Firm* — David B. Kelley; Carlson, Gaskey & Olds, P.C.

(57) ABSTRACT

An electrified vehicle assembly includes an enclosure assembly of a battery pack. The enclosure assembly has a coating. An attachment point is disposed within the enclosure assembly. The enclosure assembly is secured directly to the attachment point. The assembly includes a coating clearing feature that removes some of the coating from the enclosure assembly when the enclosure assembly is secured directly to the attachment point.

19 Claims, 4 Drawing Sheets

TRACTION BATTERY PACK COATING CLEARING FEATURE AND COATING CLEARING METHOD

TECHNICAL FIELD

This disclosure relates generally to grounding a traction battery of an electrified vehicle and, more particularly, to a grounding portions of a battery pack enclosure that has been coated.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. A traction battery of an electrified vehicle can include battery cells arranged in one or more arrays with an enclosure.

SUMMARY

In some aspects, the techniques described herein relate to an electrified vehicle assembly, including: an enclosure assembly of a battery pack, the enclosure assembly having a coating; an attachment point disposed within the enclosure assembly, the enclosure assembly secured directly to the attachment point; and a coating clearing feature that removes some of the coating from the enclosure assembly when the enclosure assembly is secured directly to the attachment point.

In some aspects, the techniques described herein relate to an electrified vehicle assembly, wherein the coating is an anti-corrosion coating.

In some aspects, the techniques described herein relate to an electrified vehicle assembly, wherein the coating is a non-conductive coating.

In some aspects, the techniques described herein relate to an electrified vehicle assembly, wherein the enclosure assembly includes a tray secured to a cover.

In some aspects, the techniques described herein relate to an electrified vehicle assembly, wherein the coating clearing feature is configured to remove the coating to establish a ground path between the enclosure assembly and the attachment point.

In some aspects, the techniques described herein relate to an electrified vehicle assembly, wherein the enclosure assembly includes a base material that is coated with the coating, the base material a metal, a metal alloy, or both.

In some aspects, the techniques described herein relate to an electrified vehicle assembly, wherein the coating clearing feature is softer than the base material.

In some aspects, the techniques described herein relate to an electrified vehicle assembly, wherein the base material is steel and the coating clearing feature is aluminum.

In some aspects, the techniques described herein relate to an electrified vehicle assembly, further including a mechanical fastener extending through an aperture in the enclosure assembly to connect the enclosure assembly to the attachment point within the enclosure assembly.

In some aspects, the techniques described herein relate to an electrified vehicle assembly, wherein the attachment point includes a bore that receives the mechanical fastener, the coating clearing feature distributed about the bore.

In some aspects, the techniques described herein relate to an electrified vehicle assembly, wherein the bore is a threaded bore.

In some aspects, the techniques described herein relate to an electrified vehicle assembly, wherein bore opens to a surface, the coating clearing feature including at least one ring projecting from the surface.

In some aspects, the techniques described herein relate to an electrified vehicle assembly, wherein the at least one ring includes at least three concentric rings.

In some aspects, the techniques described herein relate to an electrified vehicle assembly, wherein at least one ring has a triangular cross-sectional profile.

In some aspects, the techniques described herein relate to an electrified vehicle assembly, wherein the attachment point is a stand-off from a cross-member that is within the enclosure assembly.

In some aspects, the techniques described herein relate to an electrified vehicle assembly, wherein the coating clearing feature is a portion of the stand-off.

In some aspects, the techniques described herein relate to an electrified vehicle assembly, wherein the coating clearing feature is separate from the stand-off and is sandwiched between the attachment point and the enclosure assembly when the mechanical fastener is connecting the enclosure assembly to the attachment point.

In some aspects, the techniques described herein relate to a traction battery grounding method, including: securing an enclosure assembly of a battery pack to an attachment point disposed within the enclosure assembly; and during the securing, removing a coating on the enclosure assembly using a coating clearing feature.

In some aspects, the techniques described herein relate to a method, wherein the coating is removed from an underside of a cover of the enclosure assembly as a mechanical fastener threadably engages the attachment point during the securing.

In some aspects, the techniques described herein relate to a method, wherein the attachment point is a stand-off from a cross-member of the battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A battery pack assembly can include an enclosure assembly housing battery cells and other components. The battery pack assembly can be grounded to a frame of an electrified vehicle.

The enclosure assembly can be a metal or metal alloy base material. A coating is often applied to the base material to address potential corrosion issues. The coating can be a paint. The coating can cover all exposed surfaces of the base material and can inhibit grounding the battery pack assembly.

This disclosure details a method and assembly used to remove the coating from certain areas of the enclosure assembly to establish a ground path between the enclosure assembly and other components of the battery pack. The ground path extends to a frame of the electrified vehicle.

Figure 1:
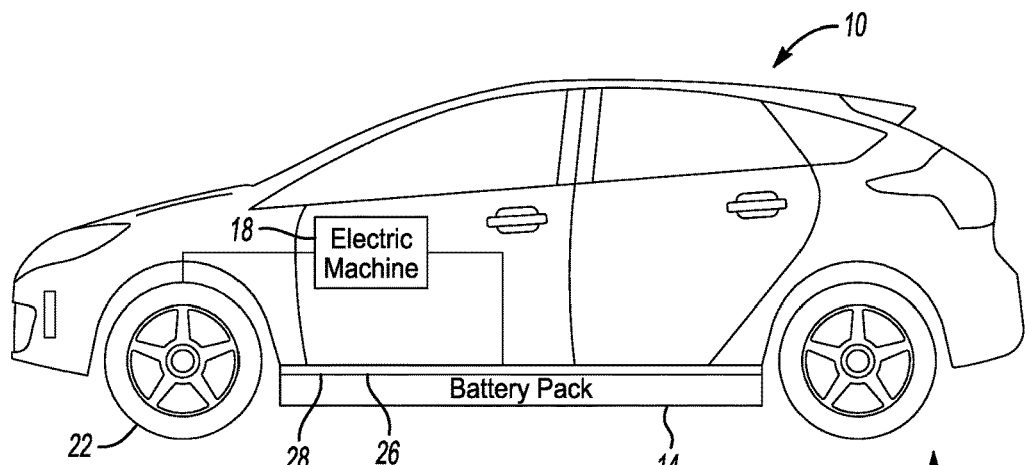
FIG. 1 illustrates a side view of an electrified vehicle having a battery pack.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22.

The battery pack 14 is, in the exemplary embodiment, secured to an underbody 26 of the electrified vehicle 10 and, in particular, frame rails 28 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a battery pack.

Figure 2:
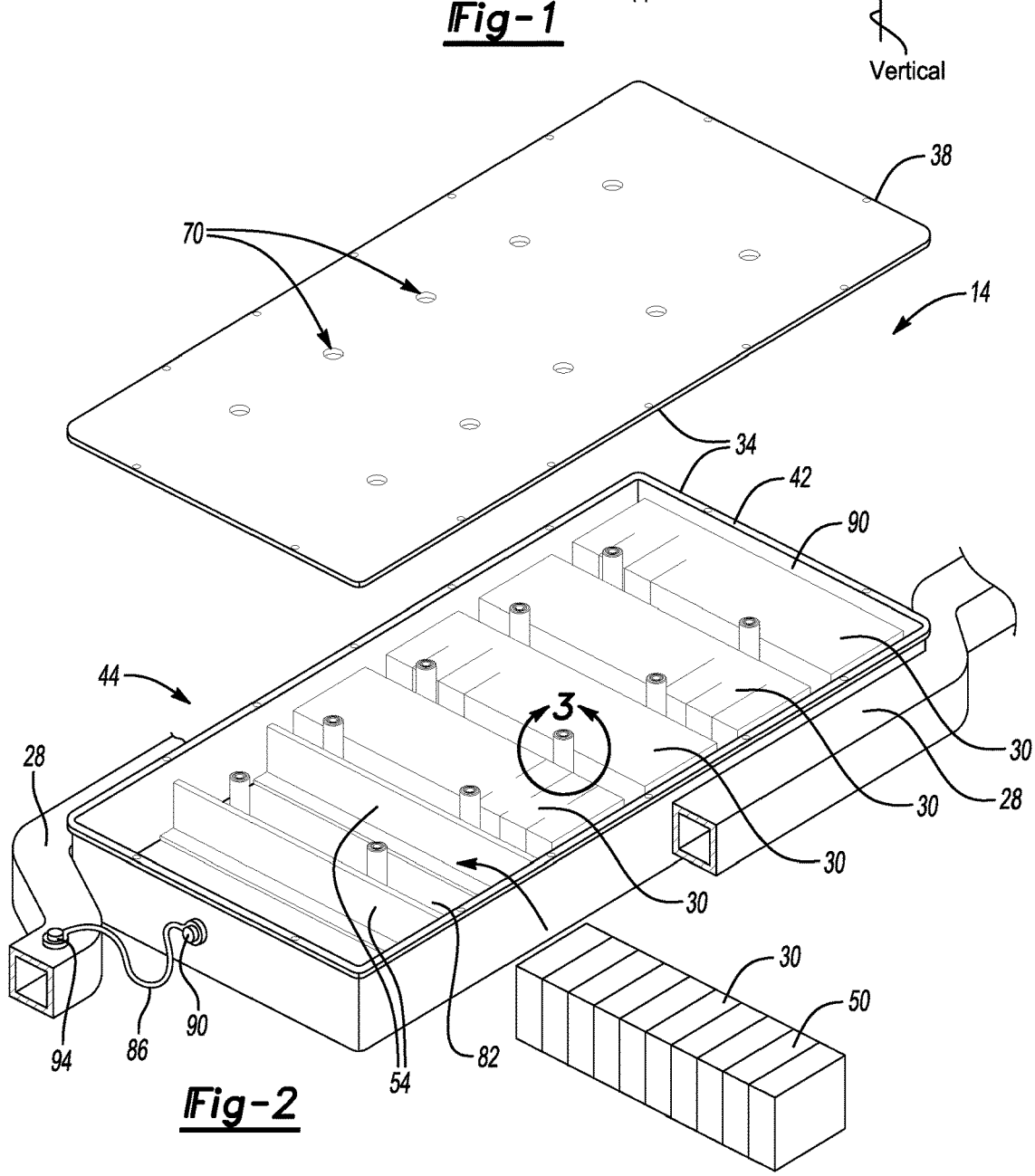
FIG. 2 illustrates a partially expanded, perspective view of the battery pack from the electrified vehicle of FIG. 1.

With reference now to FIG. 2, the battery pack 14 includes a plurality of arrays 30 held within an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the plurality of arrays 30.

The arrays 30 each includes a plurality of battery cells 50 (or simply, "cells") stacked side-by side relative to each other. The battery cells 50 are for supplying electrical power to various components of the electrified vehicle 10.

Although a specific number of the arrays 30 are illustrated in the various figures of this disclosure, the battery pack 14 could include any number of the arrays 30 having any number of cells 50. Further, the arrays 30 of the example battery pack 14 are disposed on the same level or tier, but in other examples, the battery pack 14 may include multiple tiers of the arrays 30—some on a first tier, and some on a second tier that is vertically above the first tier. In other words, this disclosure is not limited to the specific battery pack configuration shown.

Within the interior area 44 are a plurality of cross-members 54. One of the cross-members 54 is disposed between each the arrays 30. The cross-members 54 can enhance the structural integrity of the battery pack 14.

Figure 3:
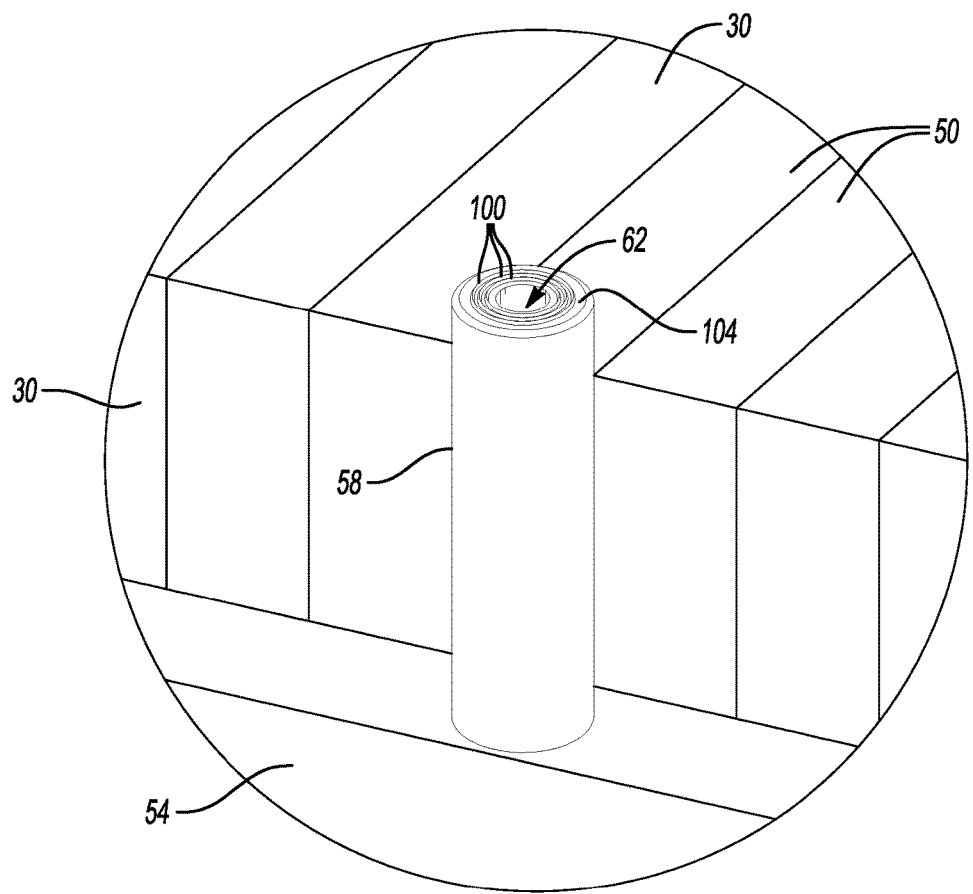
FIG. 3 illustrates a close-up, perspective view of a stand-off within the battery pack of FIG. 2.
Figure 4:
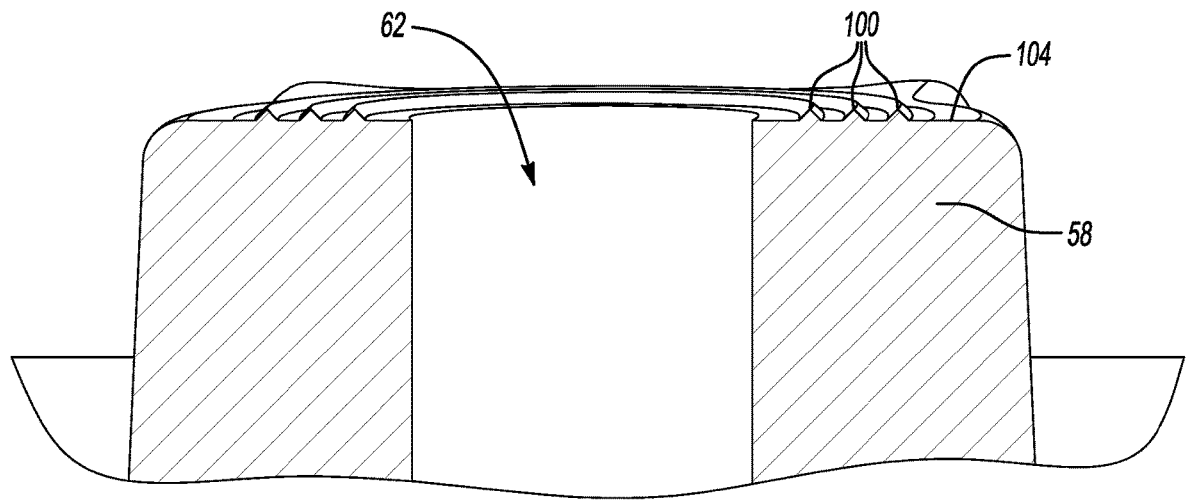
FIG. 4 illustrates a section view through the stand-off of FIG. 3.
Figure 5:
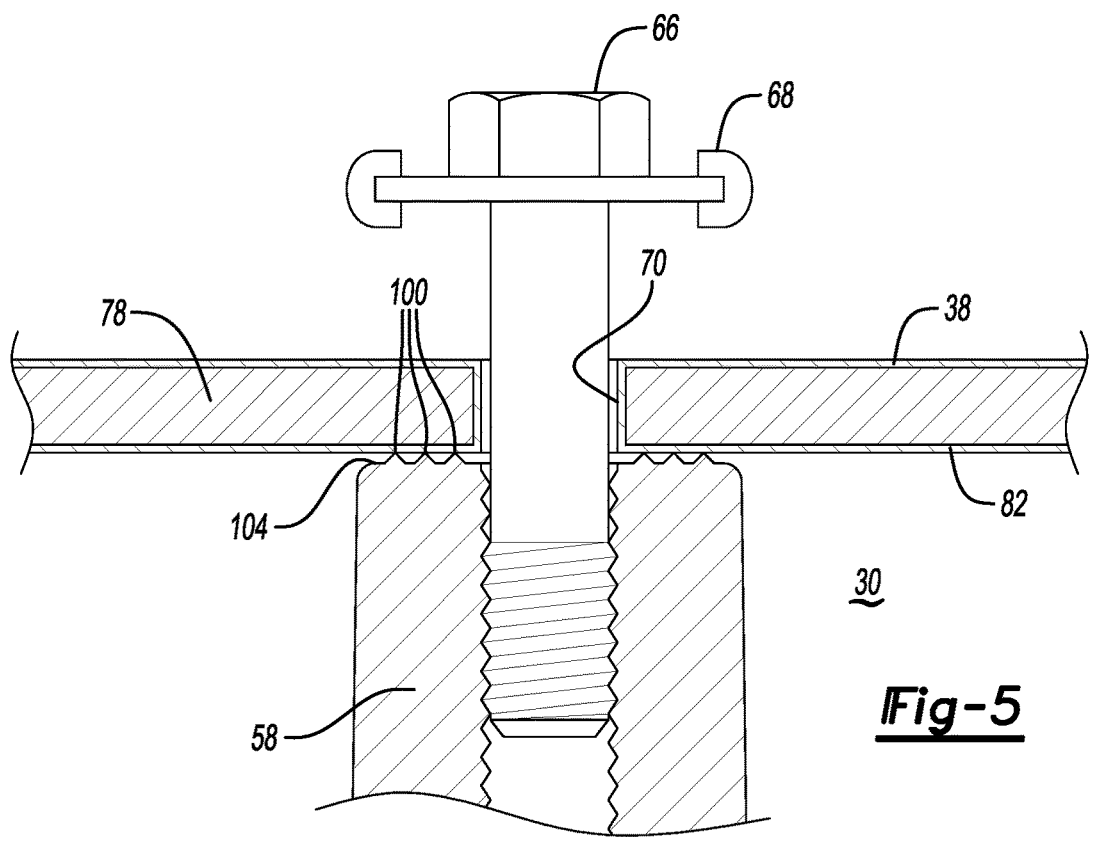
FIG. 5 illustrates a section view through the stand-off of FIG. 3 as a mechanical fastener is moving to engage the stand-off to secure an enclosure cover.
Figure 6:
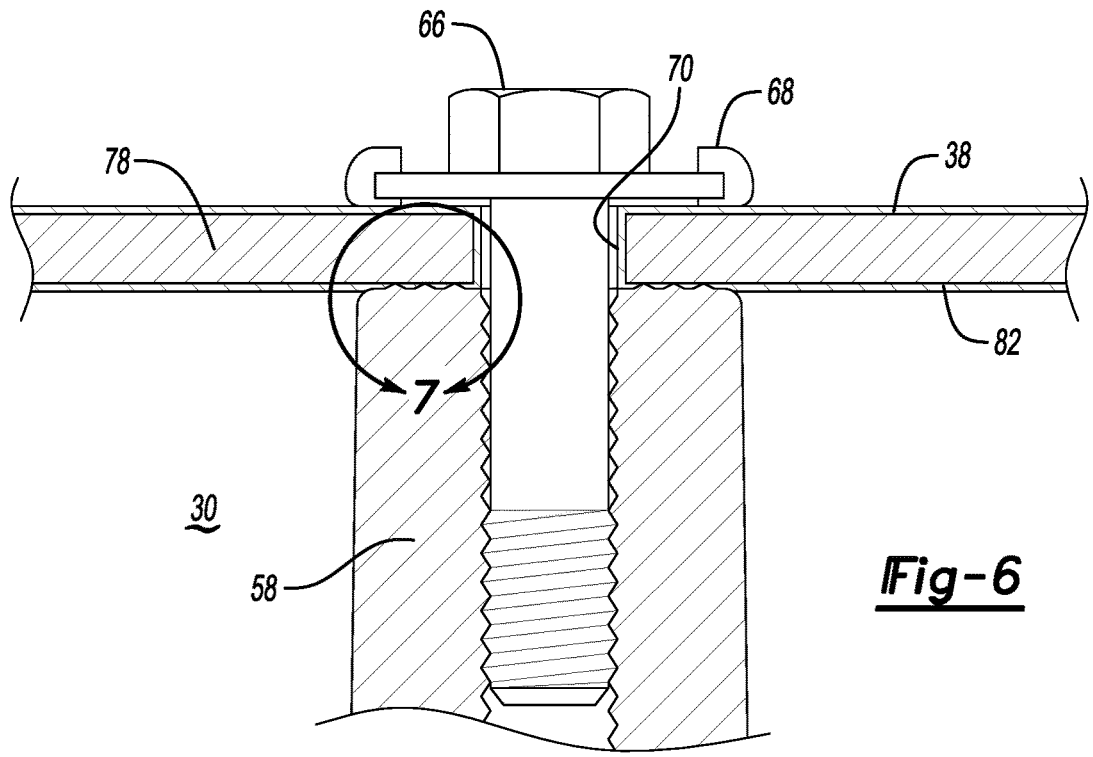
FIG. 6 illustrates a section view through the stand-off of FIG. 3 after the mechanical fastener has engaged the stand-off to secure the enclosure cover and when a coating clearing feature has removed coating.
Figure 7:
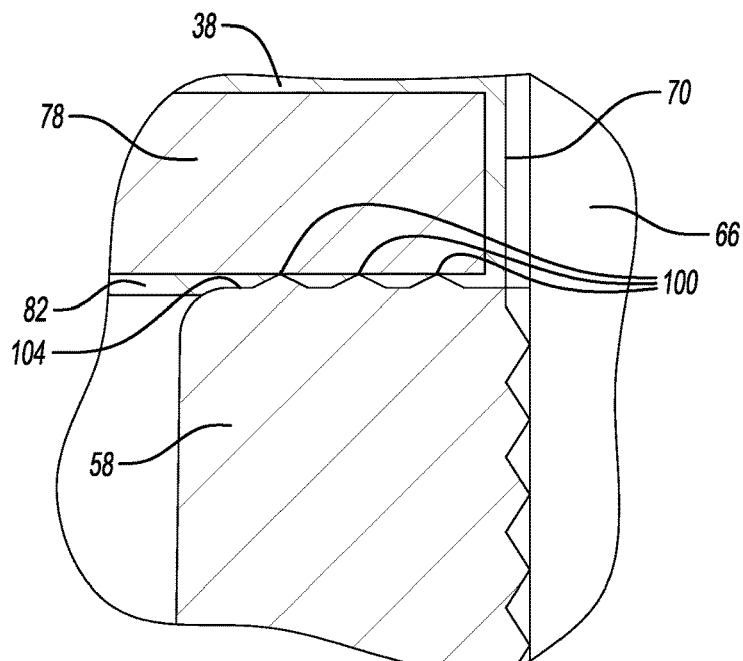
FIG. 7 illustrates a close-up view of an area in FIG. 6.
Figure 8:
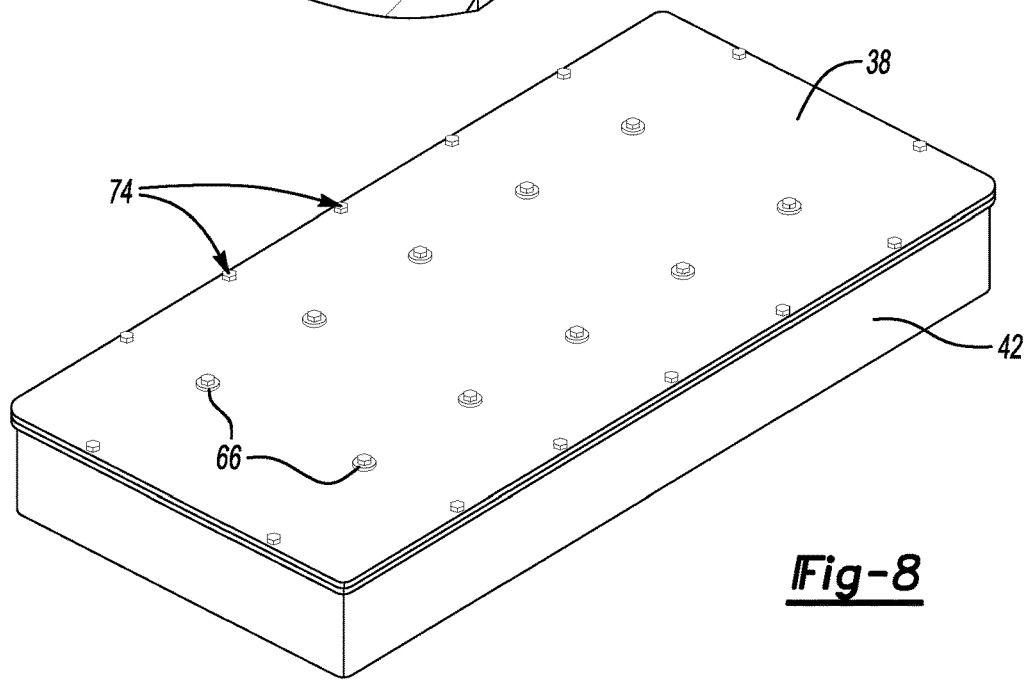
FIG. 8 illustrates a perspective view of the battery pack of FIG. 2.

With reference now to FIGS. 3 and 4 and continued reference to FIG. 2, the cross-members 54 include stand-offs 58 that extend vertically upward to the enclosure cover 38. Vertical, for purposes of this disclosure, is with reference to ground and a general orientation of the electrified vehicle 10 during operation.

The example stand-offs 58 each include a threaded bore 62. The stand-offs 58 provide an attachment point disposed within the enclosure assembly 34.

Referring to FIGS. 5-8 with continued reference to FIGS. 2-3, mechanical fasteners 66 extend through a respective apertures 70 in the enclosure cover 38 to secure the enclosure cover 38 to the stand-offs 58. The fasteners 66 can include a seal 68 to block movement of contaminants and moisture through the aperture 70.

About a perimeter of the enclosure assembly 34, a plurality of mechanical fasteners 74 secure the enclosure tray 42 to the enclosure tray 42.

The enclosure cover 38 and the enclosure tray 42 each include a base material 78 that is a metal or a metal alloy. In this example, the base material 78 is steel.

All exposed surfaces of the base material 78 of the enclosure cover 38 and all the exposed surfaces of the base material of the enclosure cover 38 are coated by a coating 82 to inhibit corrosion. The coating 82 can be considered an anti-corrosion coating. The coating 82 is non-conductive. The base material 78 is, in contrast to the coating 82, electrically conductive.

Surfaces within the facing the interior area 44 are coated by the coating 82 even though these surfaces are unlikely to face conditions that cause corrosion. Selectively coating some surfaces and leaving other surfaces uncoated can be complex.

In this example, the enclosure tray 42 is grounded to one of the frame rails 28 via a grounding strap 86. A self-piercing fastener 90 is used to secure an end of the grounding strap 86 to the enclosure tray 42. As the self-piercing fastener 90 is torqued down, the self-piercing fastener 90 cuts through the coating 82 of the enclosure tray 42 so that the self-piercing fastener 90, which is metal, directly contacts the base material 78 of the enclosure tray 42. This establishes a ground path between the grounding strap 86 and the enclosure tray 42.

A self-piercing fastener 94 is also used to secure an opposite end of the grounding strap 86 to the one of the frame rails 28. This establishes a ground path between the grounding strap 86 and the frame rails 28. The ground path extends between the enclosure tray 42 and various internal components of the battery pack 14, such as the cross-members 54 and the arrays 30, via mechanical connections between the internal components and the enclosure tray 42.

Extending the ground path to the enclosure cover 38 is accomplished using a coating clearing feature 100 that is atop the stand-offs 58. The coating clearing feature 100 pierces the coating 82 of the enclosure cover 38 as the fasteners 66 extend through the respective apertures 70 to threadably engage the stand-offs 58 to secure the enclosure cover 38 directly to the attachment point provided by the stand-offs 58. The coating clearing feature 100 is configured to remove the coating 82 to extend the ground path between the enclosure assembly 34 and the attachment point provided by the stand-off 58.

In this example, the coating clearing feature 100 is a softer material than the base material 78 of the enclosure cover 38.

In a specific example, the coating clearing feature 100 is aluminum and the base material is steel.

The threaded bores 62 each open to an uppermost surface 104 of the stand-offs 58. The example coating clearing feature 100 is, in the exemplary embodiment, an arrangement of three concentric rings projected upward from the uppermost surfaces 104 stand-offs 58. The rings are distributed about the threaded bores 62. The rings have a triangular cross-sectional profile.

Figure 9:
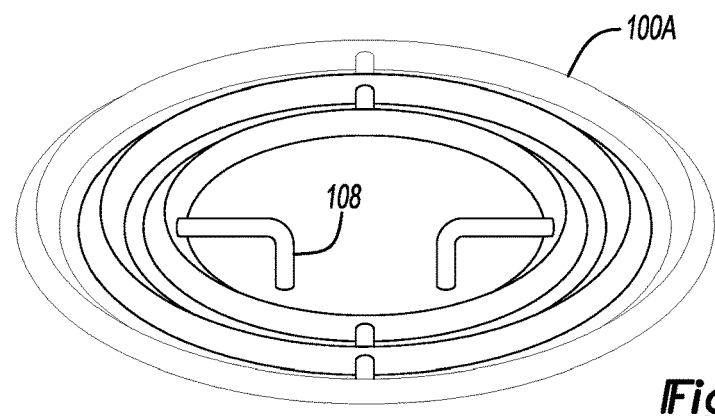
FIG. 9 illustrates a coating clearing feature according to another exemplary embodiment.

The coating clearing feature 100 is part of the respective stand-off 58 in this example. In another example, the coating clearing feature 100 could be separate from the stand-off 58, but is still sandwiched between the stand-offs 58 and the enclosure cover 38. FIG. 9 shows a coating clearing feature 100A that is separate from the stand-off 58 and can be positioned on the stand-off 58 as needed. Fingers 108 of the coating clearing feature 100A can extend into the threaded bore 62 when the coating clearing feature 100A is disposed on the stand-off 58.

A method of grounding the enclosure cover 38 can thus include securing an enclosure assembly 34—here the enclosure cover 38—to an attachment point disposed within the enclosure assembly 34. During the securing, a coating clearing feature 100 removes the coating 82 on the enclosure assembly 34 to establish a ground path between the attachment point and the enclosure cover 38.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An electrified vehicle assembly, comprising:
    an enclosure assembly of a battery pack, the enclosure assembly having a coating, the enclosure assembly providing an interior area;
    an attachment point disposed within the interior area, a portion of the enclosure assembly secured directly to the attachment point; and
    a coating clearing feature that removes some of the coating from the enclosure assembly when the enclosure assembly is secured directly to the attachment point, the coating clearing feature within the interior area.

2. The electrified vehicle assembly of claim 1, wherein the enclosure assembly comprises a tray secured to a cover.

3. The electrified vehicle assembly of claim 1, wherein the enclosure assembly includes a base material that is coated with the coating, the base material a metal, a metal alloy, or both.

4. The electrified vehicle assembly of claim 3, wherein the coating clearing feature is softer than the base material.

5. The electrified vehicle assembly of claim 4, wherein the base material is steel and the coating clearing feature is aluminum.

6. The electrified vehicle assembly of claim 1, further comprising a mechanical fastener extending through an aperture in the enclosure assembly into the interior area to connect the enclosure assembly to the attachment point that is within the interior area of the enclosure assembly, the coating clearing feature separate from the mechanical fastener, the coating clearing feature removing the coating from a surface of the enclosure assembly that faces the interior area.

7. The electrified vehicle assembly of claim 6, wherein the attachment point comprises a bore that receives the mechanical fastener, the coating clearing feature distributed about the bore, the bore disposed within the interior area.

8. The electrified vehicle assembly of claim 7, wherein the bore is a threaded bore.

9. The electrified vehicle assembly of claim 7, wherein bore opens to a surface, the coating clearing feature comprising at least one ring projecting from the surface.

10. The electrified vehicle assembly of claim 9, wherein the at least one ring includes at least three concentric rings.

11. The electrified vehicle assembly of claim 9, wherein at least one ring has a triangular cross-sectional profile.

12. The electrified vehicle assembly of claim 6, wherein the attachment point is a stand-off from a cross-member that is within the interior area of the enclosure assembly.

13. The electrified vehicle assembly of claim 12, wherein the coating clearing feature is a portion of the stand-off.

14. The electrified vehicle assembly of claim 12, wherein the coating clearing feature is separate from the stand-off and is sandwiched between the attachment point and the enclosure assembly when the mechanical fastener is connecting the enclosure assembly to the attachment point.

15. A traction battery grounding method, comprising:
    securing an enclosure assembly of a battery pack to an attachment point disposed within the enclosure assembly, the attachment point a stand-off from a cross-member of the battery pack; and
    during the securing, removing a coating on the enclosure assembly using a coating clearing feature.

16. The method of claim 15, wherein the coating is removed from an underside of a cover of the enclosure assembly as a mechanical fastener extends through an aperture in the cover to threadably engage the attachment point during the securing, the attachment point within an interior area of the enclosure assembly.

17. An electrified vehicle assembly, comprising:
    an enclosure assembly providing an interior area, the enclosure assembly having a coating, the enclosure assembly providing an interior area;
    an attachment point disposed within the interior area, a portion of the enclosure assembly secured directly to the attachment point; and
    a coating clearing feature that removes some of the coating from a surface of the enclosure assembly that faces the interior area as the enclosure assembly is secured to the attachment point.

18. The electrified vehicle assembly of claim 1, wherein the attachment point is separate and distinct from the enclosure assembly.

19. The electrified vehicle assembly of claim 17, wherein the attachment point forms no portion of the enclosure assembly.

* * * * *